(12) United States Patent
Rathunde et al.

(10) Patent No.: US 7,219,254 B2
(45) Date of Patent: May 15, 2007

(54) METHOD AND APPARATUS FOR HIGH AVAILABILITY DISTRIBUTED PROCESSING ACROSS INDEPENDENT NETWORKED COMPUTER FAULT GROUPS

(75) Inventors: Dale Frank Rathunde, Geneva, IL (US); Jerome Edward Rog, Bartlett, IL (US); William E. Witt, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 488 days.

(21) Appl. No.: 10/392,474

(22) Filed: Mar. 19, 2003

(65) Prior Publication Data

US 2004/0199804 A1 Oct. 7, 2004

(51) Int. Cl.
*G06F 11/00* (2006.01)
(52) U.S. Cl. .................. 714/1; 714/4; 714/10; 714/11; 714/12; 714/13
(58) Field of Classification Search ............ 714/4, 714/10–13
See application file for complete search history.

(56) References Cited

U.S. PATENT DOCUMENTS

| | | | |
|---|---|---|---|
| 5,687,308 A * | 11/1997 | Jardine et al. ............... 714/4 |
| 5,938,765 A | 8/1999 | Dove et al. |
| 6,353,898 B1 | 3/2002 | Wipfel et al. |
| 6,721,907 B2 | 4/2004 | Earl |
| 6,801,937 B1 | 10/2004 | Novaes et al. |
| 2002/0049845 A1* | 4/2002 | Sreenivasan et al. ....... 709/226 |
| 2003/0081556 A1 | 5/2003 | Woodall |
| 2003/0101304 A1 | 5/2003 | King et al. |
| 2003/0125032 A1* | 7/2003 | Collins ...................... 455/450 |
| 2004/0153708 A1 | 8/2004 | Joshi et al. |

OTHER PUBLICATIONS

Parallel Processing & Parallel Databases☐☐http://www-rohan.sdsu.edu/doc/oracle/server803/A54639_01/ch1_unde.htm.*

* cited by examiner

*Primary Examiner*—Robert Beausoliel
*Assistant Examiner*—Charles Ehne (57) ABSTRACT

A plurality of local network groups of computers (102) are coupled together by a network (104). Independent processing systems that execute a single operating system are coupled together by a network (220) to form the local network groups. The independent processing systems may have more than one CPU (202). One or more of the independent processing systems may share power, cooling and a housing, thereby forming a common fault processor group (200). An application is written to execute across multiple independent processing systems and common fault processor groups. That is, the application runs in many instances that each run on independent processing systems. The multiple instances of the application provide some measure of high availability by using N+K sparing or the like. The application is for example, call processing or radio control. A processor notification list (304) keeps track of the independent processing systems that cooperatively provide an application. The independent processing systems monitor state information for independent processing systems on its processor notification lists. Also, the independent processing systems exchange messages periodically with independent processing systems on its processor notification list. The failure to receive a message is noted as a failure that requires recovery.

Multiple high availability software systems are permitted to coexist under a single operating system by virtue of a new software layer that coordinates initialization and requires registration of all high availability software.

9 Claims, 8 Drawing Sheets

METHOD AND APPARATUS FOR HIGH AVAILABILITY DISTRIBUTED PROCESSING ACROSS INDEPENDENT NETWORKED COMPUTER FAULT GROUPS

FIELD OF THE INVENTION

The present invention relates generally to processing telecommunications software across independent networked computer fault groups, and in particular, to a method and apparatus for distributing availability sensitive applications, such as radio control and call processing software, across independent network file sharing (NFS) fault groups to provide high availability and reliability for applications.

BACKGROUND OF THE INVENTION

Fault-tolerant and high availability processing systems are known. These systems are used in applications requiring high reliability and extremely low downtime. Exemplary applications for fault-tolerant or high availability systems include telecommunications applications, such as switching technology used in wire line and wireless telephone switching applications.

Computer-based distributed client-server type systems that are consistent with the ITU network model are being deployed in high-availability processing systems, such as telecommunications applications. Network elements, such as base stations in a wireless application, manage the access network resources, such as radios, channels, etc. Application processors (APs) make request of the network elements in order to fulfill their functions. Exemplary APs perform functions such as call processing, signaling, data traffic processing or the like.

Computer-based high availability systems typically require a relatively large amount of space or real estate. It is desirable to reduce the space required for high availability systems. Also, the cost must be reduced. These constraints are pushing telecommunications service providers to distribute applications across diskless commercial processors. Diskless commercial processors provide the price and performance needed for high availability systems such as telecommunications switching systems, but provide some reliability challenges.

One exemplary commercial high availability system includes a network interconnecting cluster groups of processors. Each cluster group has processors, including at least one boot processor and at least one satellite CPU. Typically the satellite CPUs are diskless. The boot processor includes a disk. The processors in the cluster groups run an operating system, such as UNIX, with a network file sharing ("NFS") feature. The network file sharing feature permits the processors in the same NFS group to seamlessly share disk storage. The diskless processors are booted with NFS, even though the processors may not have a disk directly attached to the processor. Each cluster group, which, in the case of NFS, is called an NFS group, typically includes a power system, cooling system, housing, and other common support functions. The common support functions reduce cost by spreading overhead among multiple processors. However, the common support functions are a single point of failure, which in large configurations, i.e., many processors, creates undesirable, large failure groups. High availability common support functions, such as N+K sparing of power supplies, fans, etc., increase availability, but also increase cost.

Software-based application processors are arranged to take advantage of the N+K processing power. Within a single cluster group running the NFS feature, applications run multiple software instances on one or more clients. A failure in a client is not fatal. However, a failure in the common support functions or boot processor of the single cluster group is fatal. Cluster group networking, where two or more cluster groups or NFS groups are connected over a network, (i.e., spans multiple NFS groups) is used to prevent a single failure in a cluster group from being fatal by providing at least one backup cluster group, i.e., a different NFS group.

In cluster group networking, the network should not be a single point of failure. Therefore, multiple access points to the network and independent network connections should be maintained. Even where there are two or more physical network access points for a single processor, for example, multiple network cards and network mediums, some network software requires that a single software stack be maintained on the processor. TCP/IP, a defacto standard in network software for IP-based systems, is a network software application that permits only one software stack per processor. The single stack is a potential single-point of failure. In order to avoid this single point of failure, another processor is provided to, among other things, add another network connection with another network stack. The additional processor has a separate path to at least one other processor and preferably to a plurality of processors. That is, the additional processor has a separate path or interface connecting it to the processor(s) that have the single software stack, which processors are typically in the same networking group or NFS group. This separate path is preferably more tightly integrated to the processor(s) and additional processor. That is, less software overhead and protocol is required for monitoring and control between the additional processor and the processor(s) tightly coupled to the additional processor. The tightly coupled path preferably provides capability for monitoring a processor "healthy" signal in hardware and controlling a signal to reset or reboot the processor. The additional processor is often called and serves as an alarm card, maintenance card, an alarm and maintenance card, chassis management card or watchdog card. This arrangement permits the processors in the system to collectively determine when a processor or communication path has a fault. Detection methods and recovery algorithms to provide the highest reliability are necessary to exploit this arrangement. The present invention provides such novel detection and recovery algorithms to provide extremely high availability.

SUMMARY OF THE INVENTION

In accordance with one aspect of the present invention, an apparatus for high availability processing is provided. The apparatus includes a plurality of file sharing processor groups coupled together by a network. Preferably, this network includes a plurality of independent network connections and media. Each file sharing processor group includes a plurality of processors. More specifically, each processor group includes a host processor with a nonvolatile storage element that stores a boot program and at least one satellite processor that boots from the host processor. Each processor is associated with an alarm card that includes a microprocessor and provides maintenance and monitoring features for high availability. In order to provide the high availability required, several detection methods are provided to determine when a processor or group of processors have failed. The detection methods are used alone, or preferably, together to detect failures in accordance with the invention.

In one failure detection method, a hardware healthy signal from a processor is monitored by the alarm card associated with the processor. The hardware healthy signal is, for example, a signal indicating normal operation of a microprocessor. The hardware healthy signal is typically available at an industry standard interface such as, for example compact PCI (peripheral computer interconnect). In addition to monitoring the hardware healthy signal, the alarm card and the associated processor periodically communicate with each other by sending messages over an industry standard bus, a backplane, serial interface, local area network (LAN), or the like. The periodic messages are referred to as a "heartbeat". The periodic messages are used to determine whether the alarm card and the associated processor are operating normally. The messages may be for example, a first message from the alarm card to the CPU to request or question whether the processor is operating normally. The processor then responds with a message indicating it is "okay", if indeed the processor is operating normally. Conversely, the processor will initiate messages to the alarm card requesting or questioning whether the alarm card is operating normally. The alarm card responds to the message from the CPU indicating it is "okay", if indeed the alarm card is operating normally. Failure to receive a response message indicates a failure that will require a recovery mechanism. Similarly, a non-normal status on the hardware healthy signal indicates to the alarm card that some failure recovery mechanism is required.

In another detection method in accordance with the present invention, the processors that execute the same application, for example, in an N+K arrangement, send heartbeat messages back and forth to each other during normal operation. That is, all the processors executing a single application are "clustered" together to monitor each other by passing heartbeat messages back and forth. The messages, for example, include a request and a response. Failure to receive a response indicates a failure that requires execution of a recovery mechanism to isolate a failure. In a preferred embodiment in accordance with the invention, a partner or processor notification list (PNL), which may also be referred to as a host list, is maintained for each processor and a copy is maintained on an alarm card associated with the processor. The PNL includes all the processors that are clustered to run an instance of an application. Partners, i.e., those processors on the same partner notification list, query each other for state health information on the partner processors. An algorithm is provided to validate partner failures and determine whether a failure is a communication failure or a node failure and initiate the proper recovery mechanism.

A high availability computing apparatus in accordance with the present invention preferably uses off-the-shelf hardware components and software applications and operating systems to leverage the cost and performance of these components. However, these components typically include some high availability features that may or may not be desirable to a particular user. The high availability management of resetting processors, configuring applications for monitoring, and the like, as purchased from a vendor, may not be acceptable to a particular user. Therefore, a novel software layer is readily adapted to interface a user's high availability software with processor and software management services provided by a vendor for high availability. In particular, this new software layer coordinates initialization of processors and applications, shutdown of processors and applications and timers for recovery of processors and applications. As a consequence, multiple high availability systems and mechanisms are integrated into a single system.

DETAILED DESCRIPTION OF THE PREFERRED EMBODIMENTS

Figure 1:
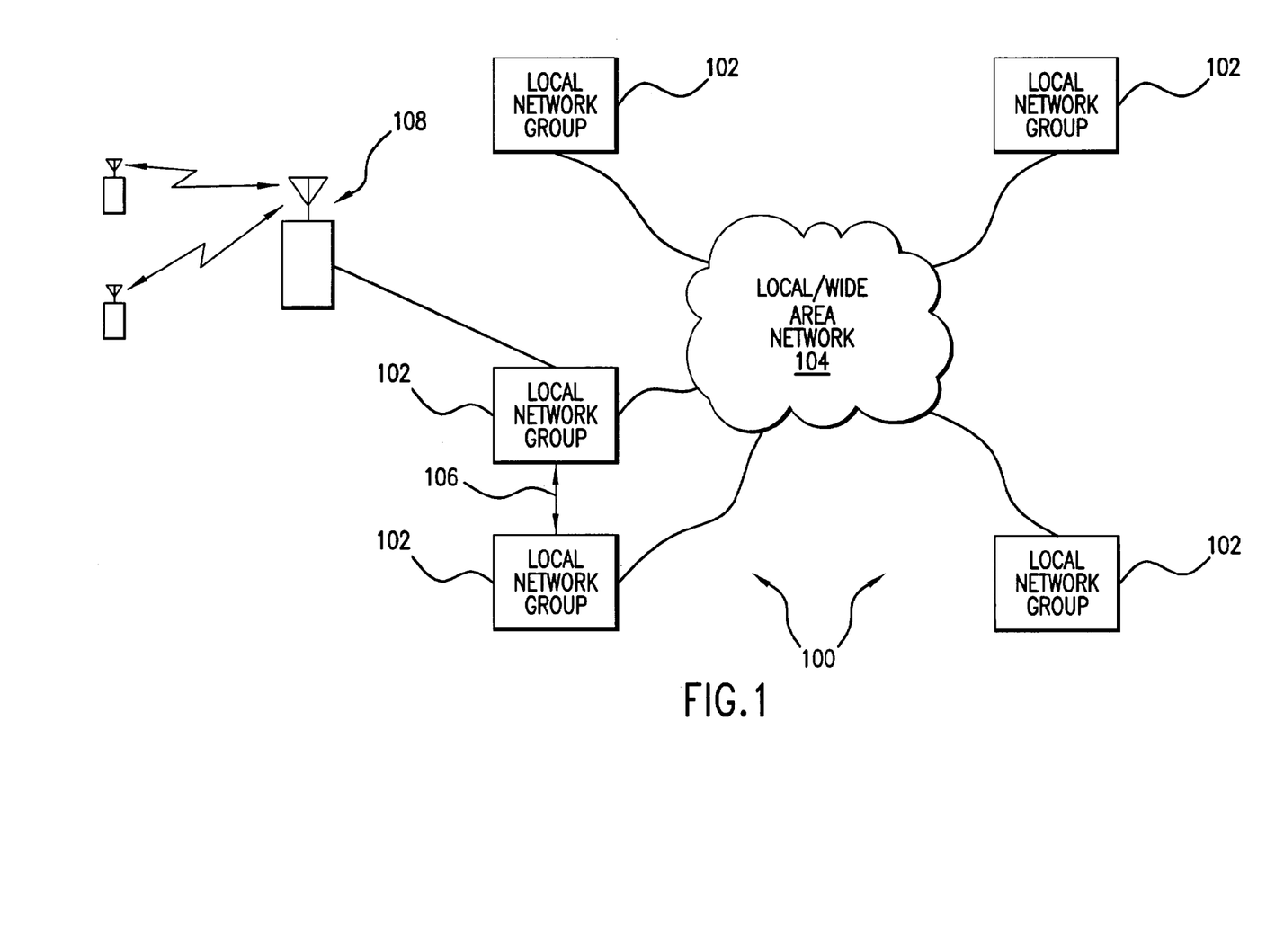
FIG. 1 is a block diagram showing a plurality of processors networked in accordance with the present invention to provide high availability.

FIG. 1 is a block diagram of a preferred embodiment of a distributed computer system 100 in accordance with the present invention. Distributed computer system 100 includes a plurality of independent processing systems that are coupled together by network connections. More specifically, distributed computer system 100 includes a plurality of local network groups 102 that are coupled together by a local or wide area network 104. Each local network group 102 includes at least one independent processing system. The processing system is independent in that it includes its own operating system and application software. A local network group preferably includes a plurality of independent processing systems that are connected via a network. Most preferably, the independent processing systems in a local network group 102 are geographically collocated and coupled together by a plurality of network connections for example, a plurality of local area networks.

Local/wide area network 104 permits the plurality of local network groups 102 to be coupled to each other. Local/wide area network 104 is preferably a private virtual network and alternatively the Internet or any other local/wide area network. Local/wide area network 104 allows the local network groups 102 to communicate with each other, including the exchange of information and cooperative processing. A myriad of arrangements may be made and are known for coupling the independent processing systems of computer system 100 to each other. In particular, some local network groups 102 preferably have connections to other network groups 102 via an additional network connection, such as the network connection 106 shown in FIG. 1.

Local network groups 102 are programmed in a manner to complete any general computer processing. In accordance with one aspect of the present invention, local network groups 102 are programmed to provide radio control and call processing software for a wireless network, such as wireless network 108 shown in FIG. 1. Wireless network 108 is, for example, TDMA, GSM, CDMA, UMTS or the like. In accordance with a preferred aspect of the present invention, a plurality of independent processing systems in distributed computer system 100 cooperatively provide an application for radio control and call processing for wireless network 108. In providing the radio control and call processing for wireless network 108 the independent processing systems in distributed computer system 100 cooperatively provide high availability radio control and call processing by exploiting redundancies in the independent processing systems and coordinating the provision of an application, including the novel apparatus and methods of the present invention. Other applications that may be provided include billing applications, visitors location register applications, home location register applications, signal processing and traffic processing. These applications may be for wireless or wire line communications systems, or a combination of these.

Figure 2:
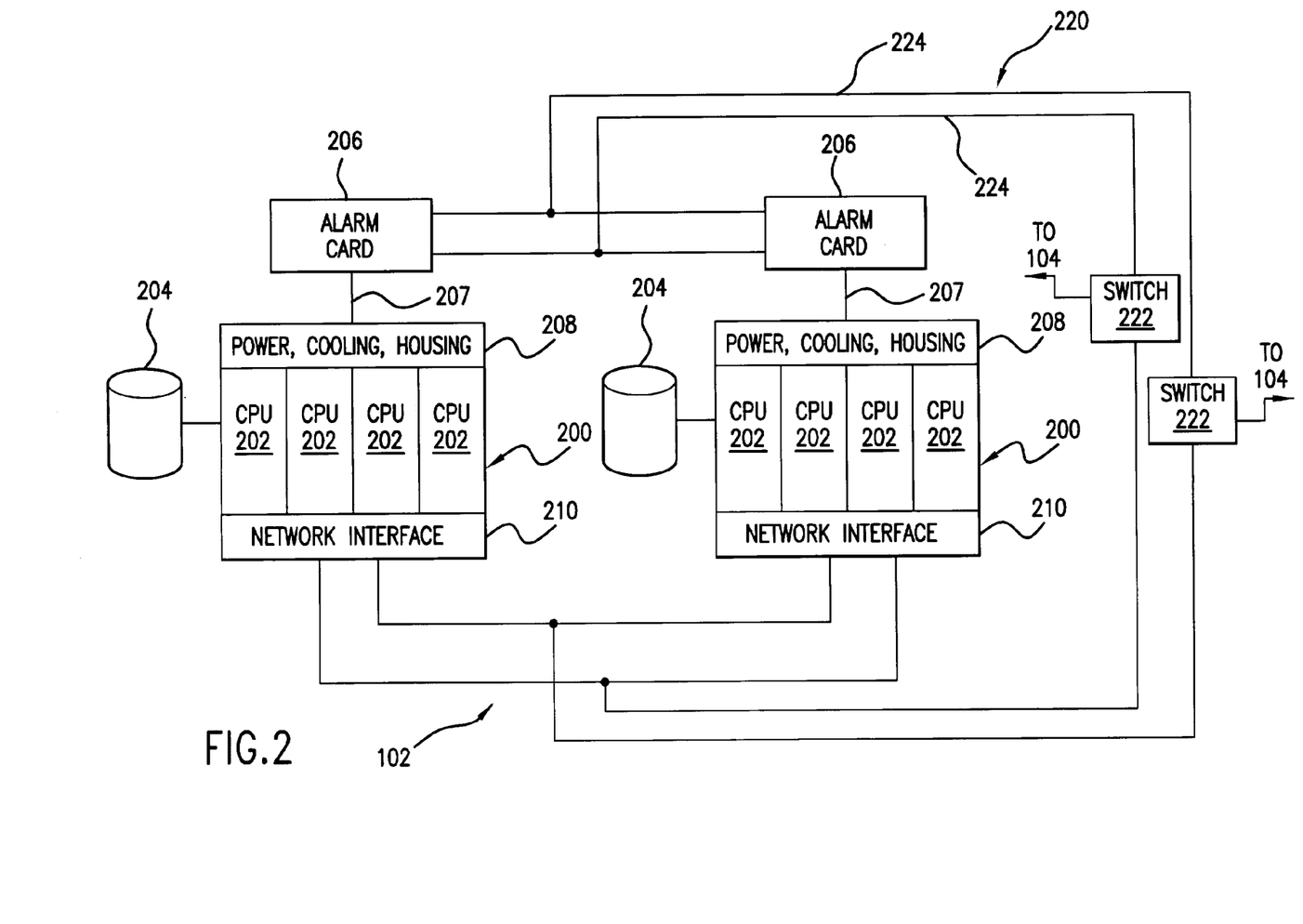
FIG. 2 is a block diagram showing in further detail a plurality of processors clustered in a local network group in accordance with the present invention to provide high availability.

FIG. 2 is a block diagram of a local network group 102 in accordance with a preferred embodiment of the present invention. Local network group 102 preferably includes a plurality of independent processing systems arranged in common fault groups 200. For simplicity, two common fault groups 200 are shown in FIG. 2. Other common fault groups are added and connected in an analogous manner. Each common fault group 200 is preferably a multiprocessor computer. That is, each common fault group 200 preferably includes multiple central processing units (CPUs) 202 for executing programs. At least one disk 204 is typically included with each common fault group 200. In a most preferred embodiment, the independent processing systems in local network group 102 are coupled together using network file sharing or NFS to form an NFS group.

Each common fault group 200 preferably is coupled to at least one alarm card 206. Most preferably, alarm card 206 is housed with and may share a backplane with CPUs 202. An alarm card interface 207 couples the alarm card 206 to CPUs 202.

Power, cooling and housing 208 are preferably common for each common fault group 200. FIG. 2 shows a dual local area network 220 that provides a high availability network connection. Dual local area network 220 includes two media paths 224 and two network switches 222. The network switches preferably include a connection to local/wide area network 104. Each common fault group 200 includes a network interface 210 and preferably a network interface for each CPU 202. Network switches 222 may be housed with a common fault group 200 and rely on some common feature of common fault group 200, such as power. Alternatively, network switches 222 are housed external to, and independent of, a common fault group 200.

Each CPU 202 preferably includes at least one microprocessor, memory, timers, non-volatile storage and interfaces to peripherals and other devices, such as the alarm card. Any suitable microprocessor, memory, timers and non-volatile storage and interfaces known in the art are used. Preferably, the microprocessor, memory, non-volatile storage and interfaces are suitable for running an operating system, such as the UNIX or Linux operating systems.

Disk 204 is any storage device or collection of storage devices. For example, disk 204 is alternatively, an internal drive or an external drive, that is accessible over SCSI, Fibre channel, TCP/IP or any other suitable interface. The storage devices are preferably arranged for high availability, including disk mirroring, multiple buses, sparing, error correction and the like. A CPU 202 that is directly coupled to a disk 204 typically serves as a boot processor and permits other CPUs 202 without disks, generally referred to as satellite CPUs, to boot using its disk 204.

Alarm card 206 preferably includes a microprocessor, memory, timers, non-volatile storage and interfaces to peripherals and other devices, such as CPUs 202. Any suitable microprocessor, memory, timers and non-volatile storage and interfaces known in the art are used. Preferably, an alarm card is associated with one or more CPUs 202. That is, an alarm card controls certain recovery and maintenance procedures for a particular CPU or set of CPUs. Where more than one CPU is associated with an alarm card 206, multiple, independent recovery timers and the like are preferably maintained for each CPU. Alarm cards 206 preferably include a network interface for coupling to dual local area network interface 220. Alarm card 206 is alternatively referred to as a maintenance card, alarm and maintenance card, chassis management card or watchdog card.

Power, cooling and housing 208 represents the core common physical elements associated with processing system 200. These elements typically include a housing, power supplies or systems, fans, backplanes, a cabinet, a chassis, shelves or other components. These elements are preferably arranged for high availability with an active and backup arrangement or with N+K sparing. For example, three power supplies (N+K) may be provided for a system that requires two (N) power supplies. Similarly, eight fans (N+K) may be provided for a housing that requires six fans. (N) for adequate cooling. And, a backplane may be equipped with two independent buses, with one bus serving as the primary and the other bus being a backup that is used if a fault occurs in the primary bus.

Network interface 210 preferably provides each CPU with two physical network connections. Most preferably, network interface 210 is a local area network interface.

In a most preferred embodiment, common fault groups 200 are commercially available processing systems that run standard operating systems, for example, the SUN MICROSYSTEMS SPARC processors, running the SOLARIS operating system. In addition, independent processing systems 200 preferably include high availability software, such as Carrier Grade High Availability (CGHA), available from SUN MICROSYSTEMS or Reliable Clustered Computers (RCC), which is proprietary to LUCENT TECHNOLOGIES INC. CGHA provides active/backup reliable NFS software. Of course, other high availability systems and operating systems may be used.

A common fault group 200 may be a single, independent processing system or may include a plurality of independent processing systems. The independent processing systems include a common operating system that runs independently. However, within the common fault group, the independent processing systems may have some actual dependence on other independent processing systems or some common dependence with other independent processing systems, for example, to provide a boot disk or because they share power, cooling and a housing.

Figure 3:
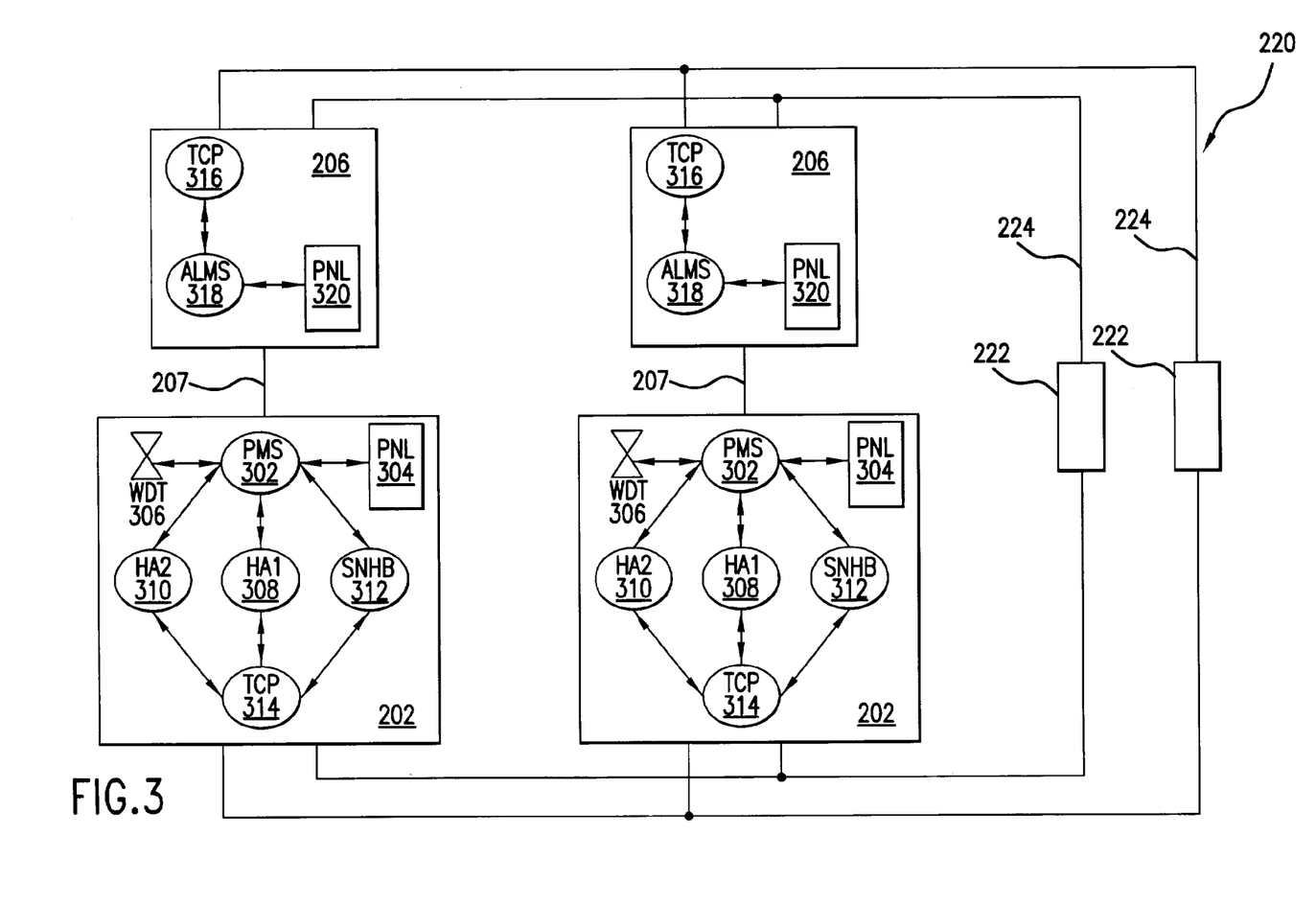
FIG. 3 is a block diagram showing software components running on two CPUs of the local network group shown in FIG. 2.

FIG. 3 is a block diagram showing an architecture of software components for a portion of an exemplary local network group 102. FIG. 3 shows two CPUs 202 and two alarms cards 206. The software architecture for the CPUs 202 and alarm cards 206 preferably applies to all similar components. Each CPU 202 shown in FIG. 3 acts as an independent processing system. Multiple CPUs 202 acting in concert to form an independent processing system may have a common or a single software architecture. Each CPU 202 is associated with a particular alarm card 206, as illustrated by the alarm card interfaces 207.

Both the processor-based CPUs 202 and the processor-based alarm cards 206 run an operating system. Preferably, the alarm cards run a small or real time operating system, such as Linux or VxWorks. And, CPUs 202 preferably run a UNIX or Linux operating system.

A few major software components run under the operating system of each CPU 202 in accordance with certain aspects of the present invention. A process management services component (PMS) 302 manages processors and needs to interact across processors in distributed computer system 100. PMS maintains and updates a processor or partner notification list (PNL) 304. Processor notification list 304 includes a list of processors across distributed computer system 100 that are cooperatively providing an application in conjunction with some process(es) running on a particular CPU 202. PNL 304 may also be referred to as a host list. The identification of processors on PNL 304 may be by name, network identify, IP address or the like. Also, PNL 304 may indirectly identify a processor by, for example, identifying a surrogate processor that will notify a partner processor. PMS also maintains and controls a transition timer, which is preferably a watch dog timer (WDT) 306. Watch dog timer 306 preferably is a timer that is initially set to run for a particular time period and must be reset prior to that time period or the timer will initiate a reset of the CPU 202. This facilitates recovery for software faults, including hangs and the like.

In accordance with the present invention, PMS 302 provides facilities for determining the number of and status of high availability software components running on a CPU 202. In particular, PMS 302 interacts with high availability software to cooperative allow generic high availability software features, such as fault detection and recovery, to be managed across independent high availability environments. Two exemplary high availability (HA) components are shown in FIG. 3 labeled HA1 308 and HA2 310. HA1 308 is preferably a commercial grade high availability component, such as CGHA available from SUN MICROSYSTEMS, Santa Clara, Calif. HA2 is preferably a proprietary high availability component, such as, RCC, which is used in telecommunications applications by LUCENT TECHNOLOGIES INC. of Murray Hill, N.J. As discussed in further detail below, the high availability applications preferably have interfaces for interacting with PMS 302 to cooperatively provide high availability over certain applications while permitting high availability under another high availability component. That is, multiple high availability schemes are permitted.

In accordance with another aspect of the present invention, a safety net heart beat component (SNHB) 312 is provided for communicating with certain processors across distributed computer system 100 in order to exchange critical state information necessary to provide high availability. In particular, SNHB 312 initiates the sending of, and anticipates receiving, messages indicating that certain processors providing an application across multiple common fault groups 200 are healthy and operating properly. More specifically, SNHB 312 communicates via messages with the processors on PNL 304 to insure that the processors that are collectively providing an application are operating normally.

A TCP/IP component 314 is provided for communicating over dual local area network 224. HA1 308, HA2 310, SNHB 312 and other components use the TCP/IP interface to communicate over dual local area network 220.

Alarm card 206 runs a TCP/IP component 316 that communicates over dual local area network 220. Alarm card 206 also runs alarm card management software (ACMS) 318, sometimes referred to in the art as chassis management software. ACMS 318 maintains a record of the state of the associated CPU(s) 202 and other attributes. ACMS 318 maintains a processor or partner notification list (PNL) 320 for each associated CPU 202. Notably, the two independent TCP/IP components 314, 316, that is, the one on the CPU 202 and the one on the associated alarm card 206, provide two independent TCP/IP software stacks and associated paths, which are utilized, as discussed further below, in the present invention to isolate faults and initiate recovery, thereby providing a higher availability system.

Figure 4:
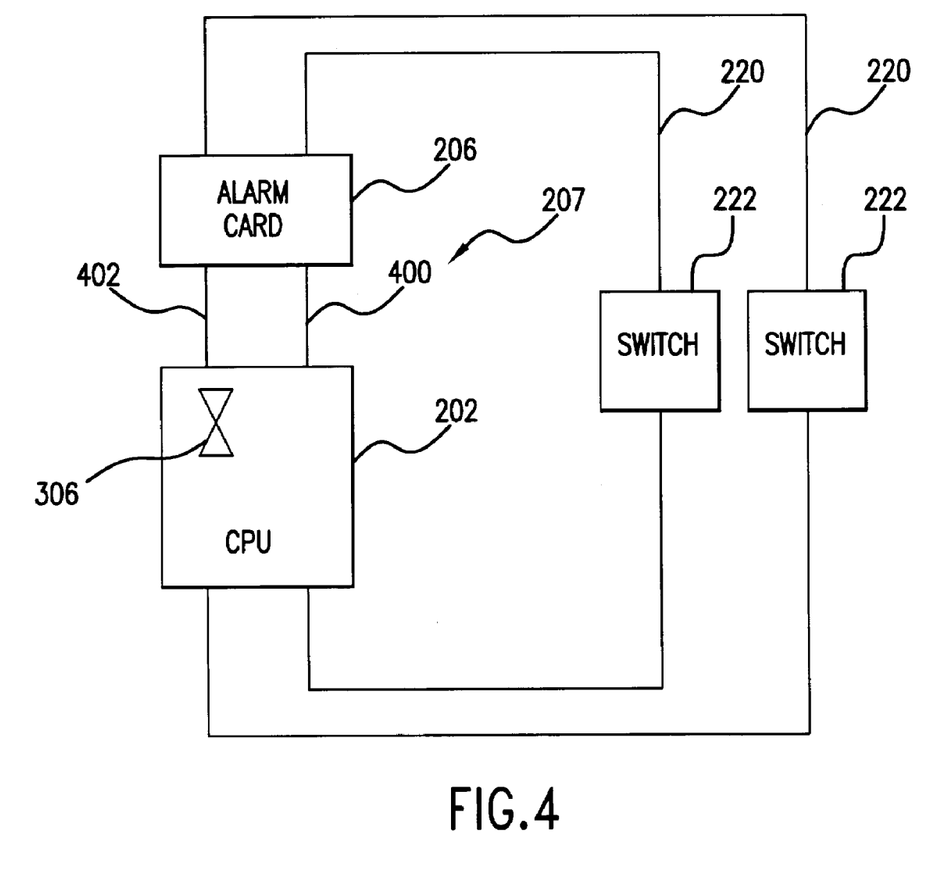
FIG. 4 is a block diagram showing an interface between a CPU and an alarm card in accordance with an aspect of the present invention.

FIG. 4 is a block diagram showing a CPU 202 interfaced to an alarm card 206. FIG. 4 illustrates a preferred arrangement for interfacing a CPU 202 to an associated alarm card for a first and second level of monitoring in accordance with the present invention. In particular, alarm card interface 207 includes a primary monitoring interface 400 and a secondary monitoring interface 402. Preferably, primary monitoring interface 400 includes a signal that reflects whether the processor(s) or microprocessor(s) on CPU 202 are functioning properly. Preferably, secondary monitoring interface 402 includes an interface for passing messages periodically between the CPU 202 and alarm card 206. In accordance with the invention, either primary monitoring interface 400 or secondary monitoring interface 402 may be used alone, or both monitoring interfaces are preferably used together. For some modes of operation, including a maintenance mode, primary monitoring interface 400 and secondary monitoring interface 402 are both disabled.

Most preferably, primary monitoring interface 400 is a single signal from the microprocessor on CPU 202 that reflects that the internal operation of the microprocessor is occurring normally without any detected fault. A signal from each microprocessor may be provided where CPU 202 includes more than one microprocessor. The primary monitoring interface may be available as a part of an industry standard bus, such as the PCI bus. Alarm card 206 preferably detects changes in the logic on the primary monitoring interface 400 to detect a fault with CPU 202. In the event that primary monitoring interface 400 indicates that the CPU 202 has encountered a fault, alarm card 202 initiates recovery mechanisms. Most preferably, the recovery mechanisms include a predetermined number of resets and/or power cycles of CPU 202. If the recovery is not successful after the predetermined number of recovery attempts, that is, the primary monitoring interface 400 does not indicate that the fault is gone, then alarm card 206 preferably records that the state of CPU 202 is faulted. Preferably, alarm card 206 immediately notifies all processors on the processor notification list of a fault or change in state for CPU 202. The state change or fault notification is preferably sent over network 220.

Most preferably, the secondary monitoring interface 402 is a serial interface over a backplane or industry standard bus shared by alarm card 206 and CPU 202. This serial interface is used to send short messages that are read by the processor(s) or microprocessor(s) on CPU 202 and alarm card 206. Preferably the messages implement a "heartbeat." That is, one message is sent periodically from the alarm card to the CPU requesting that the CPU respond with a message indicating its status is OK. For a two-way heartbeat, the CPU may also periodically send a message to the alarm card requesting that the alarm card respond with a message indicating its status is OK. Those skilled in the art will appreciate that a higher level of functionality is required to pass messages between CPU 202 and alarm card 206 over a serial bus, as compared to the primary monitoring interface 400. It is preferable that a balance between complexity and functionality is considered in implementing secondary interface 402. In particular, consideration should be given to the complexity of this interface and the level of functionality required for proper operation of this interface.

As an alternative to a request followed by a response, as described above for the heartbeat, the alarm card 206 or CPU 202 or both may periodically expect a message from its associated CPU 202 or alarm card 206 within a certain time frame. If that message is not received during the expected time frame then recovery is preferably attempted. This alternative "heartbeat" reduces the number of messages required to be passed between an alarm card 206 and its associated CPU 202. Another preferred alternative is to combine the request and response heartbeat with an expected message heartbeat, for example, by beginning with a request and a response, then switching to expected messages after a predetermined period of time or a predetermined event or level of functionality.

As discussed above, with respect to FIG. 3, a safety net heart beat component 312 is provided in accordance with the present invention. The safety net heart beat provides a third level of monitoring, that is, an additional level of monitoring above and beyond the primary monitoring and secondary monitoring that are accomplished using the primary monitoring interface 400 and the secondary monitoring interface 402. This third level of monitoring, if used, may be used separately, or in combination with, the primary and/or secondary monitoring. Central to this third level of monitoring is the processor or partner-notification list PNL 304. PNL 304 includes a list of all independent processing systems, that is physical CPUs 202, that are cooperatively providing a high availability application. The CPUs 202 in the PNL 304 may be located anywhere in distributed system 100. Preferably the CPUs 202 in the PNL 304 are spread across multiple common fault groups 200. The provision of the high availability application is controlled by the application itself and any high availability software, using many known methods, including N+K sparing and the like. The safety net heart beat feature merely requires that each PNL 304 has an accurate account of the CPUs 202 that are working in concert in some manner to provide an application. PNL 304 need not contain a list of all CPUs in distributed system 100 nor a list of CPUs 202 that are not working in concert with a particular CPU 202. Each PNL 304 is unique to the associated CPU 202.

In accordance with the safety net heart beat feature, a heartbeat is maintained between all CPUs 202 on a PNL 304. In other words, each CPU establishes a safety net heartbeat with every CPU on its PNL 304. By virtue of the safety net heartbeat, each CPU maintains state information on all CPUs that are associated with it for the purpose of providing a high availability application. In its most simplistic format, the state information includes whether the CPU is active and operating normally, and whether the CPU is inactive, due to a fault, maintenance operation or another circumstance. Changes in the state information are preferably used to keep the PNL 304 updated. For example, once a CPU is put in the faulted inactive state, it may be appropriate to remove that CPU from the PNL 304 of each CPU that previously relied upon that CPU to cooperatively provide an application. Conversely, when a CPU is added to cooperatively process an application with another CPU, each CPU providing the application should update its PNL 304 to reflect this association. No heartbeat is maintained or expected for CPUs that are in an inactive state.

The safety net heartbeat is accomplished by message passing as discussed above. In particular a request message and a response message is preferably implemented. Or, an expected message is sent periodically. Or, a combination of the request and response message and the expected message implements the heartbeat. The network connections between CPUs are used for message passing. Most preferably, TCP/IP is used for passing messages to implement the safety net heart beat feature. When a response message is not received, or an expected message is not received, fault detection and recovery mechanisms are implemented. In particular, in accordance with the present invention, fault detection includes distinguishing communications (e.g., network) failures from CPU failures for more precise recovery mechanisms.

Figure 5A:
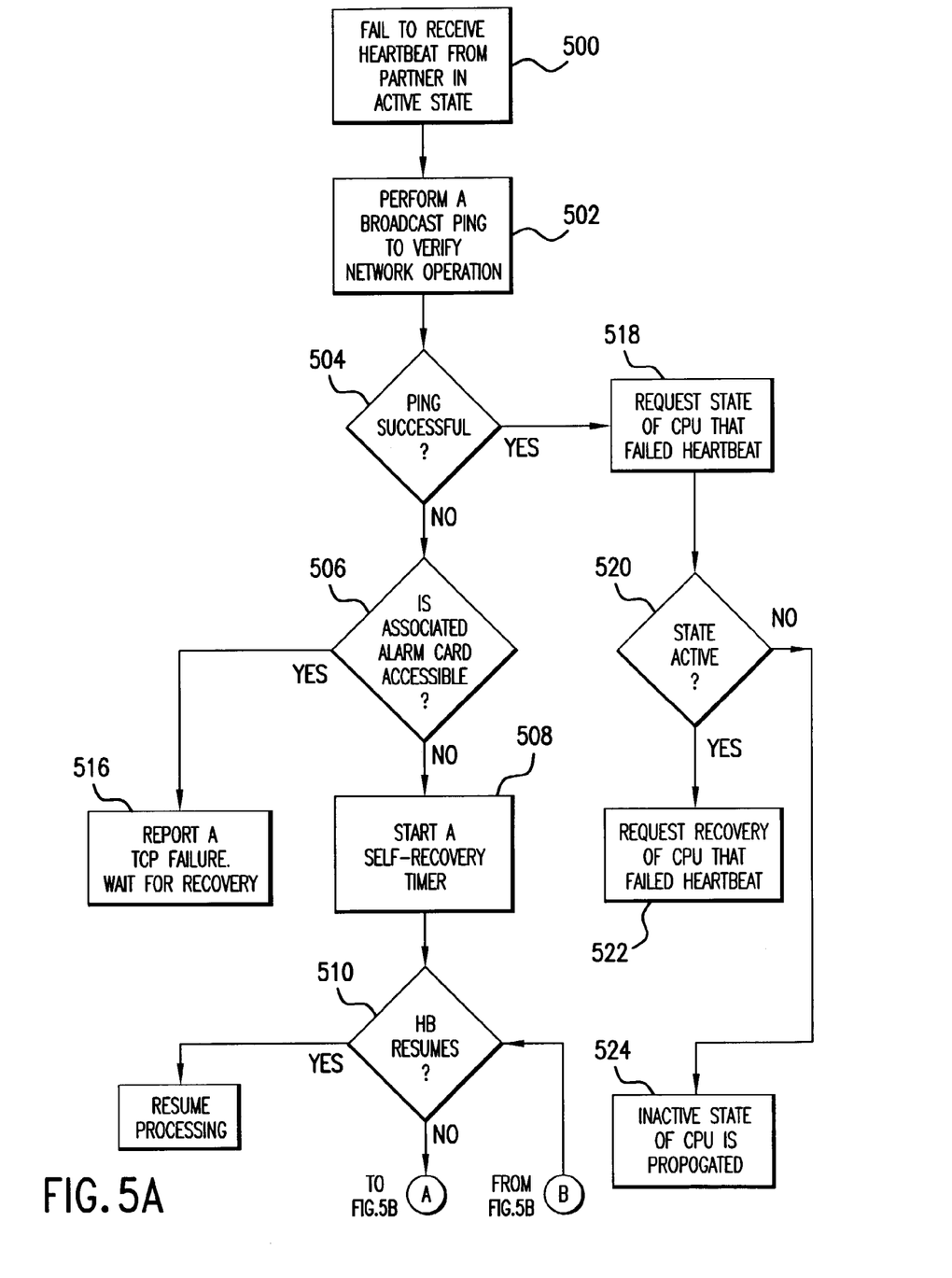
FIGS. 5A and 5B are a flow chart illustrating a fault isolation and recovery method in accordance with the present invention.
Figure 5B:
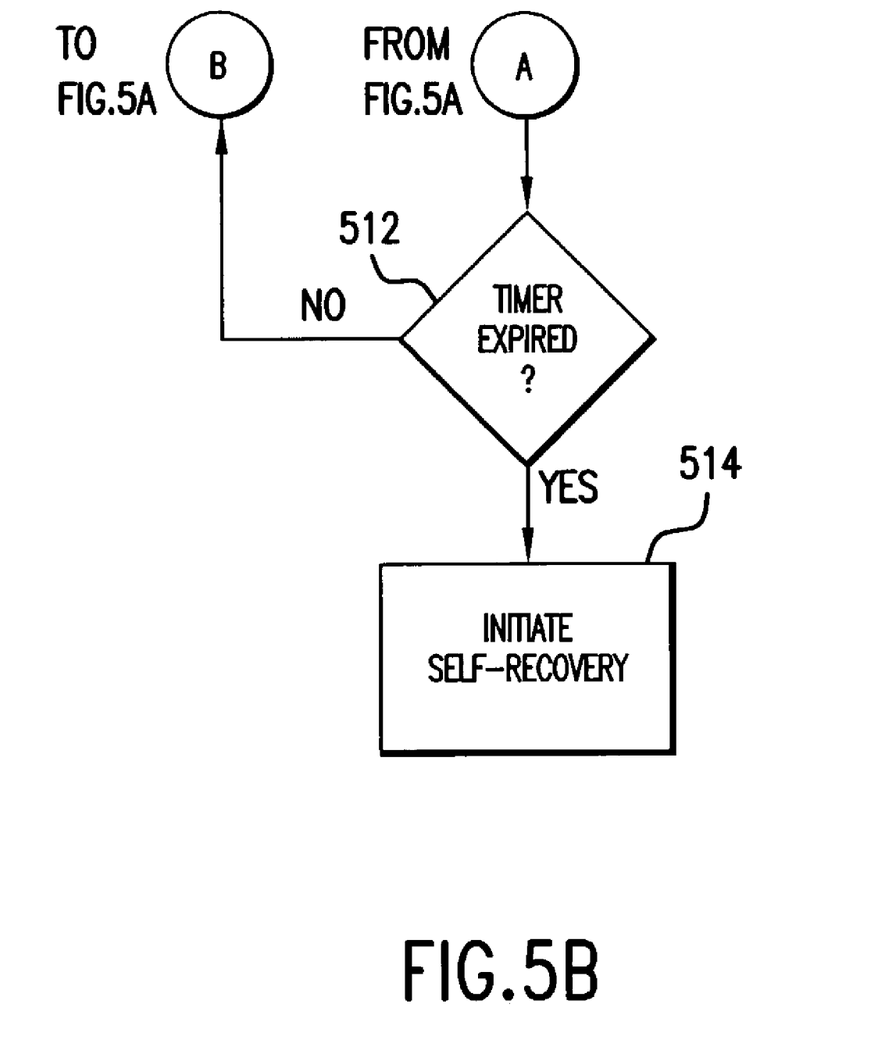

FIG. 5 is a flow chart illustrating a preferred method for recovery in the event a safety net heartbeat failure occurs, that is a heartbeat is lost. Preferably, a heartbeat is considered lost when a predetermined number of expected messages are not received during a predetermined interval. In a preferred embodiment, a heartbeat is considered lost when 3 expected messages are not received in a specified time period that preferably ranges from 0.1 to 10 seconds. Each independent processing system separately implements the recovery mechanism. Recovery begins when there is a failure to receive a heartbeat from an active CPU or independent processing system on the PNL 304 (500). The first step in recovery is to broadcast a message on the network in an attempt to test communications functionality generally (502). In a preferred embodiment using TCP/IP, a broadcast ping is attempted. The broadcast ping is a network message that is sent to all the elements of a sub network, where the sub network is defined by the IP address. All members of the sub network that receive the ping will return a reply message. The broadcast ping is particularly helpful to isolate a communication failure on the CPU itself and initiate self-recovery. In particular, if no responses are received to the broadcast ping then a local communication failure on the CPU is likely.

A determination is made as to whether or not the broadcast message was successful. In the case of the broadcast ping, a single response from the sub network is considered a success (504). On the other hand, no response to the broadcast ping from the sub network is considered a failure.

In the case of a failure, a further test is executed to determine if the CPU executing the recovery mechanism is able to reach its associated alarm card 206 (506). This test is preferably performed using the secondary monitoring interface 402 between the CPU and the alarm card 206. The test preferably includes a message to the alarm card and an expected response. If the expected response is not received; then a self-recovery timer is preferably started (508). The timer is set, for example, at 20 seconds or another suitable value. If the heart beat resumes before the timer expires (510), as in the case of a transient communications failure, then the timer is cleared and processing is permitted to continue (512). On the other hand, if the timer expires (512), prior to the heartbeat resuming, as in the case of a non transient or more permanent communications failure, then self-recovery is attempted (514). Self-recovery, which is known in the art, preferably includes a reboot or reset for a predetermined number times, followed by powering down if recovery to an operational state is not accomplished in the predetermined number of times.

In the case where the alarm card 206 associated with the CPU is reachable (506), then a communications failure is reported (516). In the preferred embodiment using TCP/IP, a TCP/IP failure is reported to higher level maintenance software. In this case, self-recovery is not necessary since the alarm card is reachable and will be able to initiate recovery of the CPU if appropriate.

If the broadcast message is successful (504), then the CPU executing the recovery mechanism requests the state for the CPU that failed the heartbeat (518). This is preferably accomplished by a message directly to the subject CPU over the LAN and/or a message to the alarm card associated with the subject CPU over the LAN. The messages may be in any suitable form known in the art.

If the state of the CPU returned is active (520), then recovery of the subject CPU is requested (522). Preferably, the request for recovery is made by only one CPU on PNL 304. To facilitate this, one CPU providing a common application is preferably designated the active-lead node and serves as the administrative node for the application. There is only one active-lead node at any time. While all CPUs execute the recovery algorithm and know the state of a failed CPU, only the active-lead node request recovery of the failed CPU. If the active-lead node is the CPU that failed, then a predetermined backup lead CPU becomes the active-lead node and performs the recovery.

The request for recovery is preferably accomplished by sending a message to the alarm card associated with the subject CPU. The state of the subject CPU is changed to faulted on the CPU executing recovery. Where the PNL 304 includes a listing of applications for each listed CPU, then the faulted state may be sent to other CPUs in the PNL 304 that share an application with the subject CPU, as determined from PNL 304. In addition to updating state information, additional recovery, such as promoting a standby CPU to active or otherwise adjusting availability and resources may be accomplished, preferably by the high availability subsystem or application software running on the CPUs executing the safety net heart beat recovery.

If the state of the CPU returned is not active or no CPU state is returned (520), then the state of the subject CPU is changed in the PNL 304 on the CPU 202 executing the recovery mechanism to inactive (524). This state is preferably also sent to other CPUs that share applications with the subject CPU, as determined from PNL 304 (524).

Figure 6:
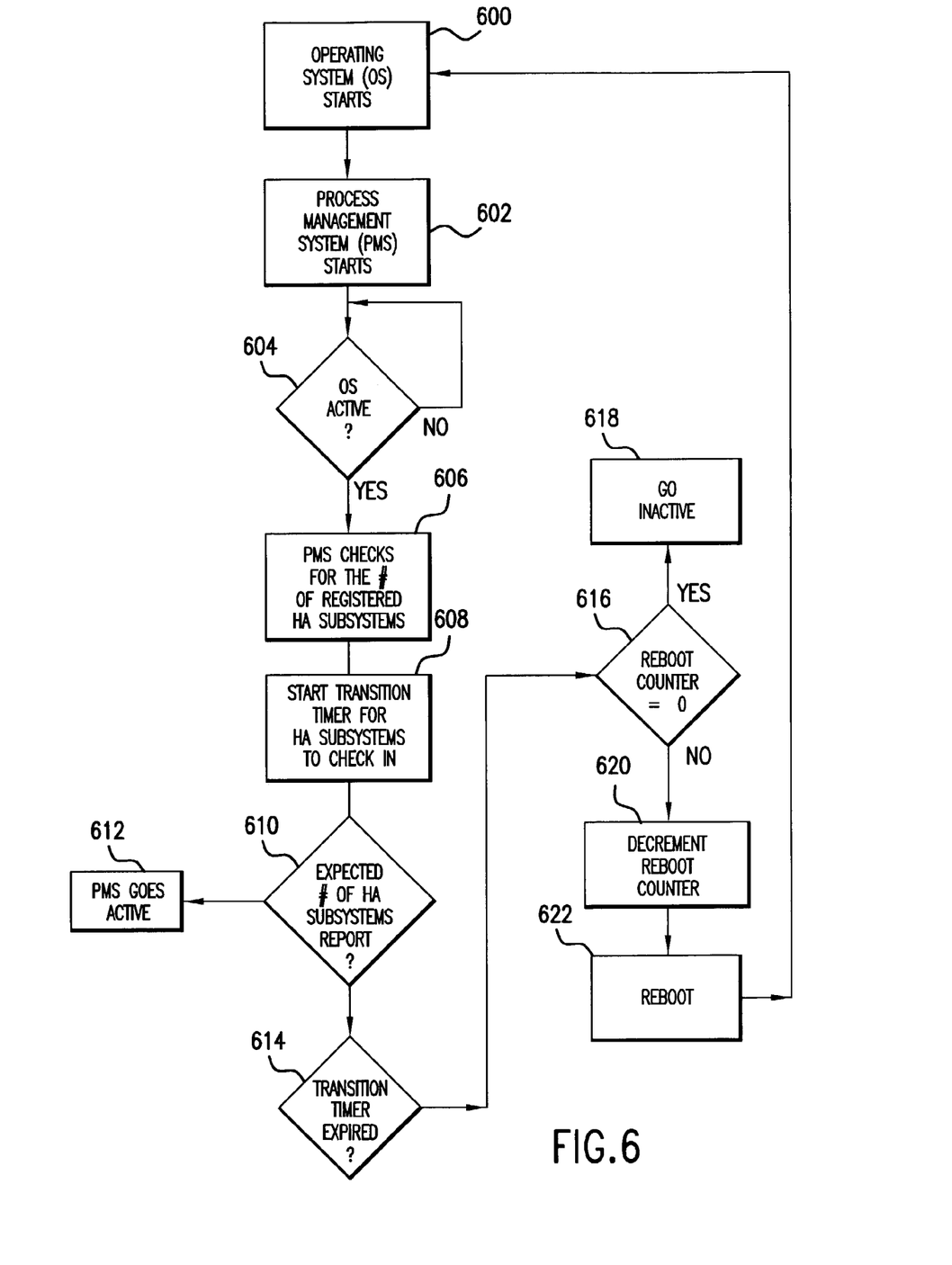
FIG. 6 is a flow chart illustrating a method for managing multiple high availability systems in accordance with the present invention.

In accordance with another aspect of the present invention, multiple high availability systems are accommodated by a novel software layer that coordinates the initialization of independent processing systems and high availability software, coordinates the shutdown of independent processing systems and high availability software, and controls timers and recovery of independent processing systems and high availability software. FIG. 6 is a flow diagram illustrating a preferred embodiment of a process for initialization in accordance with this aspect of the present invention.

First, the operating system boots (600). Then the novel process management system, PMS 302, starts its initialization process (602). The process management system waits until the operating system is active before initializing the high availability software components, for example HA1 308 and HA2 310 (604). After the operating system is active (604), PMS 302 checks the number of pre-registered high availability subsystems, such as HA1 and HA2 (606). In a preferred embodiment, the number of high availability subsystems is stored in non-volatile storage on each independent processing system. Most preferably, the number of pre-registered high availability systems is stored in non-volatile RAM on each independent processing system.

After determining the number of pre-registered high availability subsystems, a transition timer is started (608). The transition timer determines a time period during which each high availability subsystem must check in with PMS 302. That is, before the transition timer expires, PMS 302 expects each pre-registered high availability system to indicate to PMS that it is active and operating properly. If the expected number of pre-registered high availability subsystems check in with PMS (610), prior to the transition timer expiring, then PMS component 302 reaches the active state (612). Preferably, the transition time is implemented on the alarm card. Alternatively, the transition timer is implemented on the CPU.

On the other hand, if the transition timer expires prior to each expected high availability system checking in (614), then some recovery mechanism is attempted. Preferably, recovery is executed under control of the alarm card. In particular, in a preferred embodiment, a reboot counter on the associated alarm card is checked to see if it is zero (616). The reboot counter initially has a value equal to the number of reboot attempts that should be made in a recovery situation. If the reboot counter is zero (616), then the PMS system takes the CPU offline or to the inactive state (618). However, if the reboot counter is higher than zero (616), then the reboot counter is decremented (620) and the CPU is rebooted or reset as a recovery mechanism (622).

If PMS component 302 reaches the active state (612), then the high availability systems operate as programmed. However, PMS must be alerted if a high availability system goes offline or inactive, either under its own control or under the control of an administrator. When a high availability system goes offline or inactive, for example, for maintenance, PMS is notified and the number of registered high availability systems is adjusted. Preferably, this adjustment is made in non volatile storage on the independent processing system where the change is made. This enables PMS to keep current on the number of registered high availability subsystems, for example, in case of another initialization of PMS. Similarly, if a high availability system is initiated after the operating system and PMS are active, for example, to add a high availability subsystem, then the high availability subsystem must register with PMS. Then PMS updates the number of registered high availability subsystems.

By virtue of the present invention, multiple levels of fault detection are used, either separately or in combination, to monitor normal operation. Monitoring occurs, selectively, for each independent processing system and/or for groups of independent processing systems that cooperatively provide an application. Advantageously, communications failures are distinguished from processor failures. Multiple high availability systems are coordinated and accommodated. And, selective cost effective high availability is accomplished.

An extremely available system is accomplished according to certain aspects of the invention. Preferably, an application is implemented using N+K spairing of instances of the application across multiple common fault groups. More specifically, where multiple fault groups are arranged in active/backup pairs, then the instances of the application are spread across multiple active/backup pairs, so that a failure in one active/backup pair is not fatal to the application because of the instances running on another active/backup pair. In particular, where the software that controls the switch between an active or backup common fault group has a fault, some measure of tolerance to this fault is maintained on the application level by spreading the application across multiple active/backup pairs of common fault groups.

Figure 7:
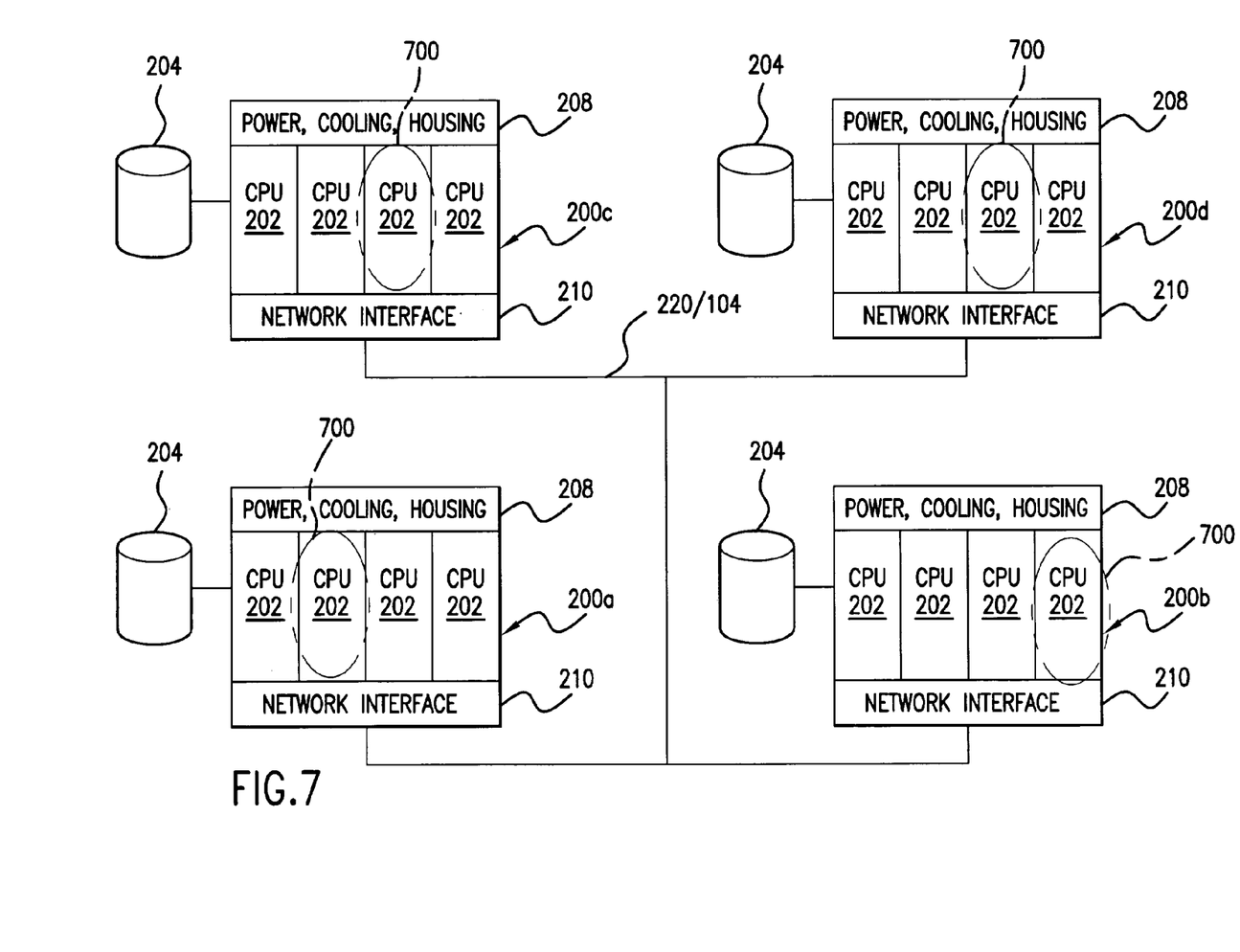
FIG. 7 is a block diagram showing an extremely available system with an application spread among fault group active/backup pairs in accordance with the present invention.

FIG. 7 illustrates the extremely available system described above. Shown in FIG. 7 are four common fault groups coupled together by network 220 to form a distributed computer system. More specifically, common fault group A 200*a*, common fault group B 200*b*, common fault group C 200*c* and common fault group D 200*d* are shown.

For simplicity dual media for the network and alarm cards are not shown. Common fault group A 200a and common fault group B 200b are preferably arranged as an active/backup pair. That is, software, such as reliable NFS Software, coordinates processing between group A 200a and group B 200b such that a failure in the boot processor for group A is not fatal to the satellite processors of group A, because the boot processor of group B acts as a backup. Similarly, group C 200c and group D 200d are arranged as an active/backup pair. In accordance with a preferred extremely available system, several instances 700 of an application are executed on processors in group A 200a, group B 200b, group C 200c and group D 200d, as shown. Hence, if there is a failure in group A, for example, group B acts as a backup for some processing. Moreover, if there is a failure in group A 200a and group B 200b, application instances on group C 200c and group D 200d continue processing. Notably, processing continues even if the software coordinating the active/backup pairing fails on one active/backup pair.

Whereas the present invention has been described with respect to specific embodiments thereof, it will be understood that various changes and modifications will be suggested to one skilled in the art and it is intended that the invention encompass such changes and modifications as fall within the scope of the appended claims.

The invention claimed is:

1. A high availability processing system comprising:
 a plurality of independent processing systems coupled together via a network, each independent processing system including:
 an operating system:
 a process management component running under the operating system;
 a plurality of high availability subsystems interacting with the process management system;
 wherein the process management system maintains a number indicating a number of high availability subsystems that are available to run on the each independent processing system; and
 wherein the process management system permits the independent processing system to operate if the plurality of high availability subsystems are operational.

2. The apparatus of claim 1 wherein the number indicating the number of high availability subsystems is maintained in non volatile storage such that the number is maintained even when the independent processing system is not operating.

3. The apparatus of claim 2 wherein the number indicating the number of high availability subsystems is maintained in non-volatile RAM.

4. The apparatus of claim 1 wherein the number indicating the number of high availability subsystems is updated as a result of high availability subsystem being taken out of service.

5. A method for coordinating among multiple high availability systems running on a processor, the method comprising the steps of:
 initiating operation of an operating system on the processor;
 initiating operation of a process management system;
 determining whether the operating systems reaches an active operational state;
 determining a number of previously registered high availability systems;
 determining whether the number of previously registered high availability systems have indicated their availability for processing within a predetermined time; and
 if the number of previously registered high availability systems have indicated their availability for processing within the predetermined time, then allowing the process management system to obtain an active state.

6. The method of claim 5 further comprising the step of:
 if less than the number of previously registered high availability systems have indicated their availability for processing within the predetermined time, then rebooting or resetting the processor.

7. The method of claim 6 wherein the step of rebooting or resetting the processor is repeated only for a predetermined number of times, if less than the number of previously registered high availability systems indicates their availability for processing.

8. The method of claim of claim 5 further comprising the step of updating the number of previously registered high availability systems while the process management system is active in response to adding or removing a high availability system.

9. The method of claim 5 wherein the number of previously registered high availability systems is at least two.

* * * * *